(12) United States Patent
Sambaraju

(10) Patent No.: US 11,173,797 B2
(45) Date of Patent: Nov. 16, 2021

(54) VEHICLE CHARGING STATION WITH BUILT-IN WIRELESS ACCESS POINT, COMPUTING AND STORAGE

(71) Applicant: Berk-Tek LLC, New Holland, PA (US)

(72) Inventor: Rakesh Sambaraju, Downingtown, PA (US)

(73) Assignee: Berk-Tek LLC, New Holland, PA (US)

( * ) Notice: Subject to any disclaimer, the term of this patent is extended or adjusted under 35 U.S.C. 154(b) by 55 days.

(21) Appl. No.: 16/236,545

(22) Filed: Dec. 30, 2018

(65) Prior Publication Data

US 2020/0207228 A1 Jul. 2, 2020

(51) Int. Cl.
*H02J 7/00* (2006.01)
*B60L 53/30* (2019.01)
*B60L 53/66* (2019.01)
*B60L 53/53* (2019.01)

(52) U.S. Cl.
CPC ............. *B60L 53/305* (2019.02); *B60L 53/53* (2019.02); *B60L 53/66* (2019.02)

(58) Field of Classification Search
USPC ........................................................ 320/109
See application file for complete search history.

(56) References Cited

U.S. PATENT DOCUMENTS

| | | | | |
|---|---|---|---|---|
| 2011/0055037 A1* | 3/2011 | Hayashigawa | ......... | B60L 53/51 705/26.1 |
| 2011/0298422 A1* | 12/2011 | Failing | .................... | H02J 7/025 320/109 |
| 2013/0020993 A1* | 1/2013 | Taddeo | .................. | B60L 53/65 320/109 |
| 2013/0093393 A1* | 4/2013 | Shimotani | .......... | G01C 21/3469 320/109 |
| 2013/0170604 A1* | 7/2013 | Falk | ........................ | H04Q 9/00 377/15 |
| 2017/0237944 A1* | 8/2017 | Haas | .................... | G06Q 20/145 348/143 |

* cited by examiner

*Primary Examiner* — Samuel Berhanu
(74) *Attorney, Agent, or Firm* — Sofer & Haroun, LLP

(57) ABSTRACT

An electric vehicle charging station has a power supply, a controller and a power regulator and relay/driver for connecting to an electric vehicle. An edge computing module and a cellular base station are also included. The edge computing module is connected to the power supply and to an IP network for the internet mobile gateway of a cellular network. The cellular base station is connected to the power supply and to cellular antenna system.

2 Claims, 2 Drawing Sheets

VEHICLE CHARGING STATION WITH BUILT-IN WIRELESS ACCESS POINT, COMPUTING AND STORAGE

FIELD OF THE INVENTION

This application relates to a vehicle charging station. More particularly, the present arrangement relates to a vehicle charging station supporting wireless network functionalities and access.

DESCRIPTION OF RELATED ART

In a normal LTE network (normal=today's 3.5/4G) there are dedicated functions that require dedicated hardware. These functions that are part of the LTE's evolved core packet (EPC) and are usually centralized.

With the advancement of 5G cellular networks, the architectures of mobile networks are radically changing. One of the key enablers of 5G and its envisioned applications is the proliferation of edge computing. Edge computing refers to moving some of the traditional wireless functions (MME (Mobility Management Entity), SGW Serving Gateway), BBU (Baseband Unit), etc.) closer to the user.

Owing to the speed requirements of 5G cellular networks, and the associated time delay allowance (latency) of 1 ms for ultra-reliable low latency communications (e.g. between the cellular antenna and the base station equipment) the 5G networks will require many more physical base locations to support its antenna network.

To this end, edge data centers will be located closer to the end user and the antennas that cover them, with initial implementations placing these edge data centers closer to the wireless base stations (eNodeB) to enable the mobile edge computing based 5G architecture.

Some additional 5G applications require the mobile networks to "slice" (different applications with different quality of service requirements served by the same physical infrastructure). To address the lower latency requirement, network de-centralization is required which requires the several mobile functions to be run closer to the end user/cell tower.

In some prior art examples, the BBU and MME are co-located closer to the cell tower/access point, whereas the GW (Gateway) functionalities reside in a central office.

In all, the above described dynamic nature of the newer 5G networks requires multiple compute hardware scattered around, and closer to, the network cell towers/base stations. The compute functions residing closer to the cell powers allow/support the required edge compute functions, which are a critical component of 5G networks.

To address the high throughput requirement, massive densification of edge computing equipment and wireless base stations will be needed, amongst other things (such as more cell towers). This massive densification means smaller cells with less user capacity (per cell) that will need to be installed in several different places. In the prior art, such locations may include current wireless cellular installations such as those included in lampposts, garbage cans, old converted NYC telephone booths etc. . . . .

OBJECTS AND SUMMARY

In one embodiment of the present arrangement cellular network edge computing servers may be implemented in conjunction with electric car charging stations.

To this end an electric vehicle charging station is provided having a power supply, a controller and a power regulator and relay/driver for connecting to an electric vehicle. An edge computing module and a cellular base station are also included. The edge computing module is connected to the power supply and to an IP network for the internet mobile gateway of a cellular network. The cellular base station is connected to the power supply and to cellular antenna system.

BRIEF DESCRIPTION OF DRAWINGS

The present invention can be best understood through the following description and accompanying drawing, wherein.

DETAILED DESCRIPTION

Figure 1:
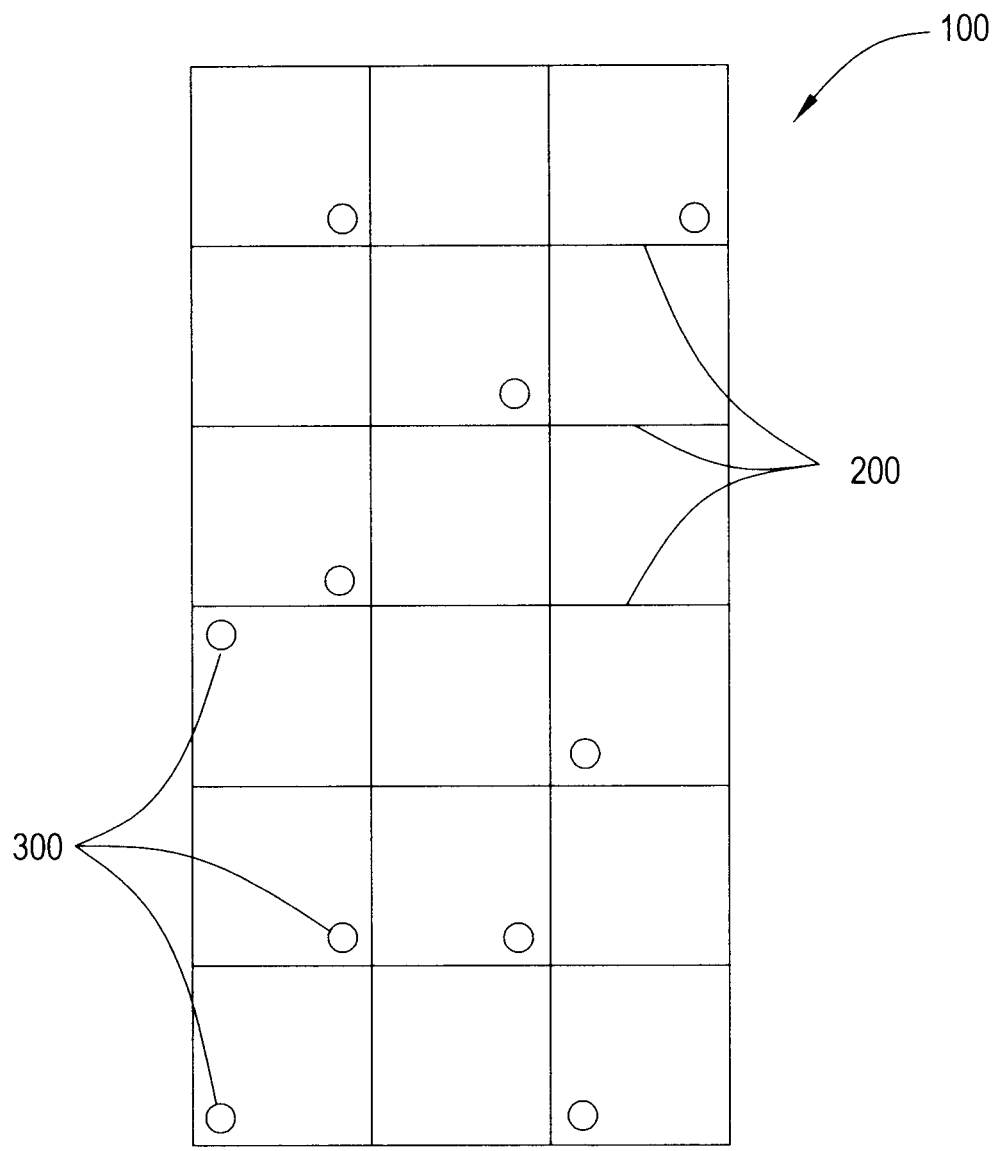
FIG. 1 is an image of a geographic region with a proliferation of cellular antenna and electric car charging stations.

In one embodiment as shown in FIG. 1, a geographic region 100 such as a section of city blocks 200, with ten (10) vehicle charging stations 300 located at various locations about grid 100. Although the present arrangement is described herein in the context of a city arrangement, the present vehicle charging stations 300 may be located in any environment and used for suitable expansion of a cellular network.

As noted above, the present arrangement includes edge computing and cellular base station material, incorporated directly into charging stations 300. Such charging stations are already located at convenient geographic locations and, as explained below have power architecture that is robust and able to easily accommodate the additional network components.

Figure 2:
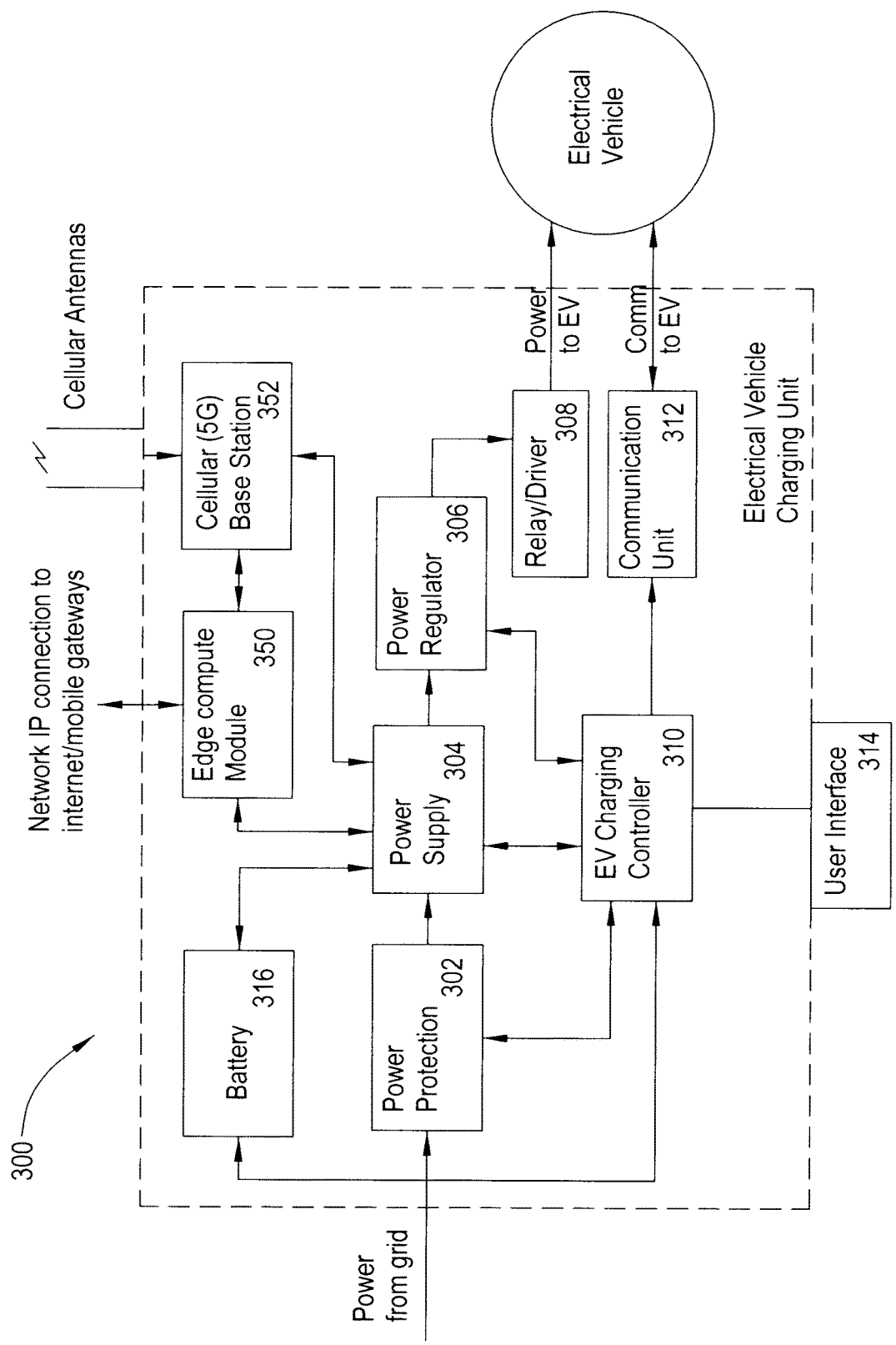
FIG. 2 is a schematic of internal components of a vehicle charging station with edge computing and base station components in accordance with one embodiment.

In one arrangement as show in FIG. 2, power is supplied from the power grid (e.g. municipal grid) to charging station 300. As illustrated, power entering station 300 is first directed to power protection unit 302 which protects charging station 300 and the other components from surges and power irregularities. From there grid power is directed to a power supply 304 which properly conditions the power and supplies it to the other components. This may include AC/DC conversion, voltage setting and power modulation to make to ultimately protect the charged vehicle. A power regulation module 306 further works in this capacity, for example, based on user input and feedback from the vehicle. A relay/driver 308 measures the power/current flow into the electric car, and also as a power driver if needed.

In one embodiment as shown in FIG. 2, a controller 310 includes a microprocessor for managing the functions of all of the components in charging station 300. A communication unit 312 is included to communicate with the vehicle and controller 310. This communication unit 312 only exchanges power and charging related data. A user-interface 314 acts as an interface between the user and charging station (e.g. for basic interface functions, payments, passwords etc. . . . ). Finally, a battery back up system 316 is connected to power supply 304 and controller 310.

Apart from these essential charging elements, charging station 300 further includes an edge compute module 350 connected to an IP network for the internet mobile gateway of a 5G cellular network. Edge compute module is connected to power supply 304 and is able to tap supply from charging station 300 without otherwise effecting its charging ability. Moreover, because of the robust electrical architecture of charging station 300, including power protection 302, and battery backup 306, edge computing module 350 is well supplied with consistent and reliable power.

As shown in FIG. 2, power charging station 300 further has a cellular (5G) base station 352 for connection to locally connected cellular antennas 354. Again, as with the edge compute module 350, base station 352 and antennas 354 use the power protection 302 and battery backup 306 so that they are well supplied with consistent and reliable power.

Such an arrangement for edge computing modules 350, and base stations 352 may be included in new charging stations 300 or be retro-fit into exiting frames. By using charging stations 300, distributed as shown in FIG. 1 and constructed as shown in FIG. 2, the architect of 5G cellular systems can benefit from the pre-existing charging station structures (robust) and their distributed locations. Moreover, as electrical vehicles are becoming more advanced and requiring more internet connectivity (for updates etc. . . . ) the inclusion of edge computing module 350 could be used to give very high bad direct access to the connected electric vehicles.

While only certain features of the invention have been illustrated, and described herein, many modifications, substitutions, changes or equivalents will now occur to those skilled in the art. It is therefore, to be understood that this application is intended to cover all such modifications and changes that fall within the true spirit of the invention.

The invention claimed is:

1. An electric vehicle charging station comprising:
a power supply;
a power regulator and relay/driver in electrical communication with said power supply, said power regulator configured to connect with an electric vehicle;
an edge computer;
a cellular base station, said edge computer and said cellular base station together supporting a plurality of cellular calls for a 5G cellular network, and
a controller configured to control components of said electric vehicle charging station including said power supply, said power regulator said edge computer, and said cellular base station,
wherein said edge computer is connected to said power supply and to an internet mobile gateway of said 5G cellular network, said edge computer being at least a first distributed component connected to at least one coupled internet mobile gateway of said 5G cellular network, and
wherein said cellular base station is connected to said power supply and to cellular antenna system, said cellular base being at least a second distributed component connected to at least one cellular antenna of said 5G cellular network, and wherein said edge computer, connected with said internet mobile gateway, and said cellular base station, connected with said cellular antenna system, together form a portion of a cell within said cellular network that is capable of supporting a plurality of cellular calls and communications of users of said cellular network.

2. The electric vehicle charging station as claimed in claim 1, further comprising a back-up battery connected to said power supply.

\* \* \* \* \*